United States Patent [19]

Quittkat et al.

[11] Patent Number: 4,496,313

[45] Date of Patent: Jan. 29, 1985

[54] METHOD OF CALCINING MINERALS CONTAINING HEAT-VALUE COMPONENTS

[75] Inventors: Wolfram Quittkat, Gauting; Gerhard Reuter, Aschheim; Rüdiger Schmidt, Munich, all of Fed. Rep. of Germany

[73] Assignee: BKMI Industrieanlagen GmbH, Munich, Fed. Rep. of Germany

[21] Appl. No.: 423,247

[22] Filed: Sep. 24, 1982

[30] Foreign Application Priority Data

Nov. 26, 1981 [DE] Fed. Rep. of Germany ....... 3146891

[51] Int. Cl.³ .......................... F27B 15/00; C04B 7/02
[52] U.S. Cl. ...................................... 432/14; 432/106
[58] Field of Search ............................ 432/14, 58, 106

[56] References Cited

U.S. PATENT DOCUMENTS

| | | | |
|---|---|---|---|
| 3,881,862 | 5/1975 | Nishida et al. | 432/106 |
| 3,891,382 | 6/1975 | Lawall et al. | 432/58 |
| 3,929,417 | 12/1975 | Rosa et al. | 432/106 |
| 4,014,641 | 3/1977 | Shigeyoshi et al. | 432/58 |
| 4,043,746 | 8/1977 | Ritzmann | 432/14 |
| 4,198,273 | 4/1980 | Dudek et al. | 432/106 |
| 4,217,092 | 8/1980 | Quittkat et al. | 432/106 |
| 4,299,564 | 11/1981 | Herchenbach et al. | 432/58 |
| 4,342,598 | 8/1982 | Kogan | 432/106 |
| 4,353,750 | 10/1982 | Quittkat | 106/100 |
| 4,370,127 | 1/1983 | Abelitis | 432/106 |

FOREIGN PATENT DOCUMENTS

1251688 10/1969 Fed. Rep. of Germany .

*Primary Examiner*—Henry C. Yuen
*Attorney, Agent, or Firm*—Karl F. Ross; Herbert Dubno

[57] ABSTRACT

A method of calcining mineral components such as bituminous limestone in which heat is recovered from the calcining process and is used to liberate volatilizable substances within the mineral matter before the latter is subjected to calcination. The volatilized and pyrolytically decomposed substances form a fuel which is burned to produce the calcining gas mixture.

2 Claims, 6 Drawing Figures

METHOD OF CALCINING MINERALS CONTAINING HEAT-VALUE COMPONENTS

CROSS REFERENCE TO RELATED APPLICATIONS

This application is related to Ser. No. 288,935 filed July 31, 1981 (U.S. Pat. No. 4,353,750) and Ser. No. 381,738 filed May 24, 1982 (See U.S. Pat. No. 4,248,639 issued Feb. 3, 1981).

1. Field of the Invention

Our present invention relates to a method of calcining minerals and, more particularly, to a method of calcining mineral substances which contain components contributing a heat value to the mineral matter. Especially the invention is directed to the production of burned lime by the calcination of bituminous limestone, utilizing heat values contributed by the bitumen components of this mineral matter.

2. Background of the Invention

Mineral matter is frequently recovered from the ground, recovered as a by-product in metallurgical mineral-recovery operation, or otherwise obtained in a form in which it contains a component, generally an organic compound, contributing some heat value to the mineral matter.

For example, bituminous limestone is limestone impregnated with bitumen, otherwise known as stinkstone and, upon excavation, contains substantial amounts of organic matter in the form of bitumens. Other minerals also contain bitumen, bituminous compounds and other organic compounds which can be said to contribute heat value to the mineral matter. Such minerals include oil shale and even tailings or washery muck from coal mining, wherein the heat value can be present in the form of coal dust or other carbonaceous particles.

Frequently, and especially in the case of limestone, it is desirable to produce a dead-burned product, hereinafter referred to as burned lime.

It is known, for example, to calcine bituminous limestone and thereby produce burned lime utilizing, in part, heat value of the bitumens contained in this mineral matter.

Processes in which the heat value of mineral matter can be utilized in conjunction with a calcination are increasingly important in present times because of the increasing cost of energy and the fact that bituminous limestone, for example, can have a heat value of about 12,000 kJ/kg of limestone.

In the past, only a fraction of this heat value has been successfully utilized.

In German patent document No. 1,251,688, for example, a process has been described for producing cement clinker from limestone and clay components utilizing oil shale, bituminous limestone, or washery muck as the fuel in a special combustion process for deacidification of the calcium-carbonate component.

This approach makes it possible to utilize the combustible components of low-value fuels, namely, such mineral matters for the preheating of the raw mineral matter to be calcined and for the partial deacidification of calcium carbonate utilizing a furnace which is especially advantageous for such combustion, for example, a fluidized bed furnace.

In this process, the heat value carrier is ground up oil shale which is introduced into the fluidized bed and burned, the resulting heating gas being passed through a fluidized bed heat exchanger to heat a lime-rich ground product (raw meal) in counterflow. The meal-like, partially burned hot oil shale covers only a fraction of the fuel requirements of the process although it does provide a mineral product which can be used as a raw material, namely, the shale which has been freed from the bitumen.

When this process is attempted with bituminous limestone, however, the efficiency has been found to fall still further.

Consequently for the dead burning of lime, e.g. in a shaft furnace, a large portion of the bitumens in the bituminous limestone raw material vaporize from the mineral matter and are lost in the exhaust gases without having contributed anything to the heat required for the calcination process and indeed subtracting from the heat which is available.

OBJECTS OF THE INVENTION

It is thus the principal object of the present invention to provide a process for the calcination of mineral matter containing components with heat value whereby disadvantages of the earlier systems can be obviated.

Yet another object of this invention is to provide a process for the purposes described which is especially effective for producing dead-burned lime from bituminous limestone.

Still another object of the invention is to provide a method of calcining limestone, utilizing as a raw material bituminous limestone and such that the heat value of the bituminous limestone is optimally utilized, a minimum of added fuel is provided and the process can be carried out as economically and fuel efficiently as possible.

SUMMARY OF THE INVENTION

These objects and others will become apparent from a method in which, according to the invention, the bituminous limestone serves as the raw material and residual heat from the calcined product is utilized directly or indirectly to drive out combustible components from the bituminous limestone, these combustible components being utilized as fuel for the calcination process and the raw material from which these components have been driven off is interposed into the calcination process as the limestone to be calcined.

Consequently, the heat transferred to the bituminous limestone in driving off the volatiles, is recovered in part in the heat capacity of the solids, which are then calcined and in part in the heat capacity of the resulting fuel gas which is subsequently to be found in the combustion gases upon burning of the volatile components.

Volatiles or bituminous components which remain in the solids are liberated and burned during the calcination.

It has been found to be advantageous, in accordance with this invention, to selectively feed the fuel which has been driven out of the bituminous limestone to locations in the process for burning at these locations and thereby optimally utilize this heat carrier.

It has been found to be advantageous to drive off the heat carrier from the bituminous limestone by heated air which is passed in direct heat exchange with the bituminous limestone. This direct heat exchange results in the formation of a mixture of the heated air and the organic components which are driven out of the bituminous limestone, this mixture preferably being combusted to calcine the limestone.

In this manner, the air-fuel mixture can be brought to an elevated temperature sufficient for ignition regardless of the ignition temperature which is a function of the composition.

In a variant of the invention, the fuel is driven out of the mineral material and the calcination occurs in a single rotary kiln or furnace which can be operated in the concurrent flow mode, i.e. where the solids and the gases flow codirectionally.

At the inlet side of this rotary furnace, heated air is blown into the shell of the furnace to initially drive off the organic components from the bituminous limestone and volatilize this heat carrier in the gas stream whereupon the mixture of fuel gas and air is ignited by air injection at a temperature slightly above the dissociation temperature of the mineral matter.

According to a further feature of the invention, the heat generated by the calcination, i.e. the exhaust gas heat, is utilized to preheat the mineral matter and to drive the heat value component therefrom in an indirect heat exchange. The heat required for calcination thus derives mainly from burning the heat carrier in the air which cools the calcined solids and is thereafter utilized to drive off the fuel gas from the bituminous limestone.

This latter embodiment has the advantage that the fuel gas can be obtained practically free from oxygen so that it can be stored or utilized as desired directly without danger.

In all of the embodiments of the invention, the waste gases of the calcination process, whether used completely or partly for the thermodisplacement of the heat value carrier from the bituminous limestone, may contain significant amounts of residual heat, especially when the mineral matter, which is to be calcined, contains a large proportion of bitumens. Under these circumstances, the temperature of the waste gases increases as does the heat which is to be found in the waste gases and has been found to be advantageous to utilize such surplus heat for the generation of steam, e.g. in a waste heat boiler or the like for other purposes in the plant.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
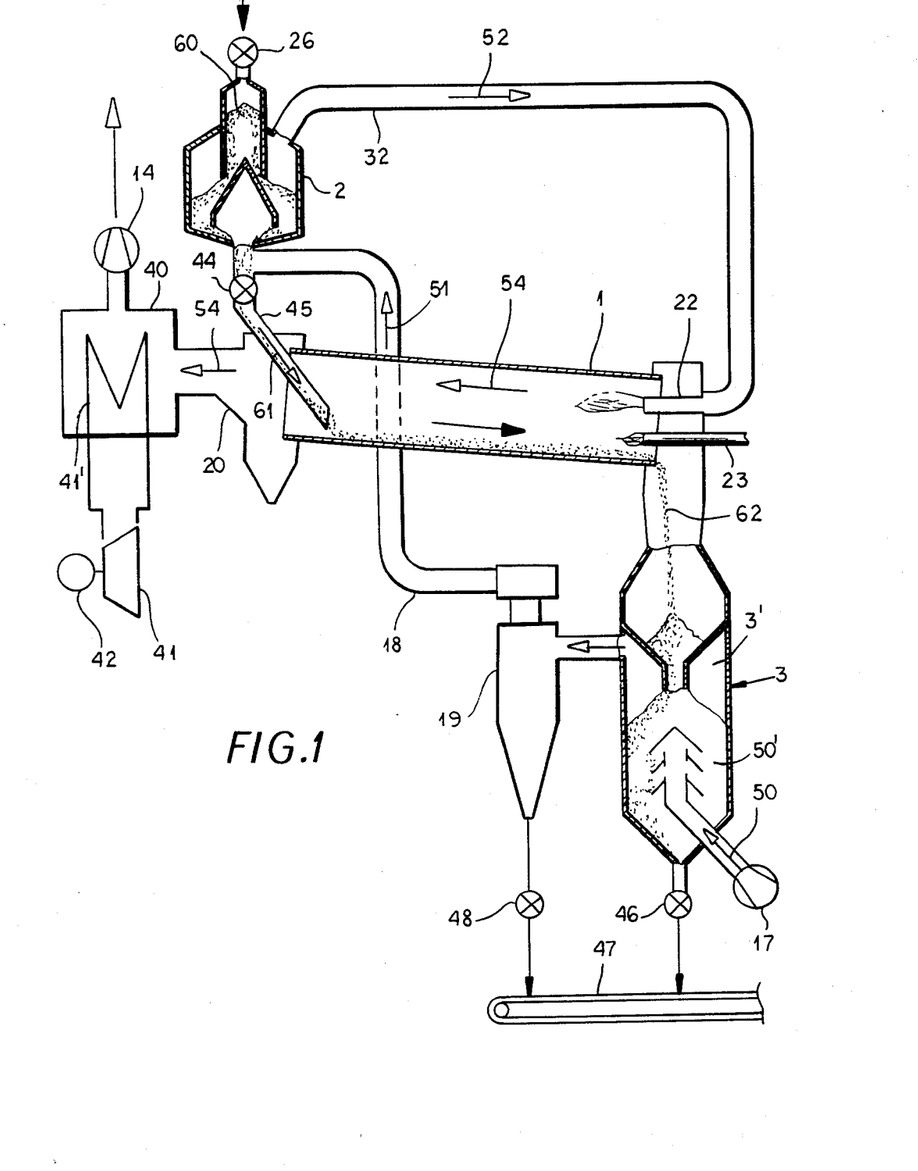
FIG. 1 is a flow diagram showing a plant in accordance with the invention and in which the rotary kiln is operated in a counterflow system.

The embodiment of FIG. 1 has been found to be especially effective for large-grain feeds, i.e. mineral matter which has previously been comminuted to a particle size in the range of 20 to 50 mm.

Basically this unit comprises a rotary kiln or furnace 1 communicating with a shaft-type preheater 2 for carrying out calcination in a counterflow system.

The head of the furnace 1 is formed with a housing 20 while the lower end of the furnace communicates with a shaft cooler 3 supplied with fresh air by a blower 17 as represented by the arrow 50.

In other words the shaft cooler 3 collects the calcined granular product from the kiln or furnace 1 (the calcinating product being represented at 63) and forms a bed of this product at 50' through which the cold air is blown so that this air is heated and is recovered via a compartment 3', cleaned in cyclone 19 and used as a heating fluid. The cooled product is discharged by a metering device 46 onto a conveyor 47, a similar metering device 48 discharging products which accumulate in the cyclone 19.

The hot gas is carried by duct 18, arrow 51, to the unit 2, which is charged with comminuted bituminous limestone via a feeder 36.

The hot gas passing through this bituminous limestone vaporizes organic volatiles trapped in the limestone to produce a fuel-air mixture which is carried by the line 32 to a burner 22 opening into the lower end of the kiln 1.

Hot exhaust gases emerge at the housing 20 enclosing the head of the kiln and are cleaned and cooled before being discharged. The hot gases may in part be used for preheating the feed 60, i.e. the bituminous limestone, before it enters unit 2 at which the volatiles are removed.

A metering device 44 and a chute 45 feed the limestone from which at least a major portion of the bitumens have been removed into the rotary kiln 1.

In operation, bituminous limestone 60, fed at a substantially constant rate by the cell gate 26, is preheated in the shaft-type preheater 2 with hot air received from line 18 and a cyclone. This hot air passes in a counterflow to the solids (compare arrows 51 and 61). The heat value carriers are thus driven out of the bituminous limestone and form a fuel-air mixture which is fed as shown by arrow 52 and line 32 to the main burner 22. An auxiliary burner 23 can be utilized to ignite the flame at the main burner 22 and to maintain this flame.

The limestone substantially freed from the volatile bitumens is fed via chute 45 into the rotary kiln 2 and is closed in this kiln so that a dead-burned product is recovered at 62 from which the residual heat is derived to vaporize organic components of the bituminous limestone.

The gas-cooling arrangement 40 following head 20 is provided as a waste heat boiler in which steam in coil 41' is superheated or water in this coil is transformed to steam to drive a turbine 41 and a generator 42. The generator power may be used to feed the fan 17, the suction blower 14 which discharges the gases and any other blowers or compressors in the plant.

Figure 2:
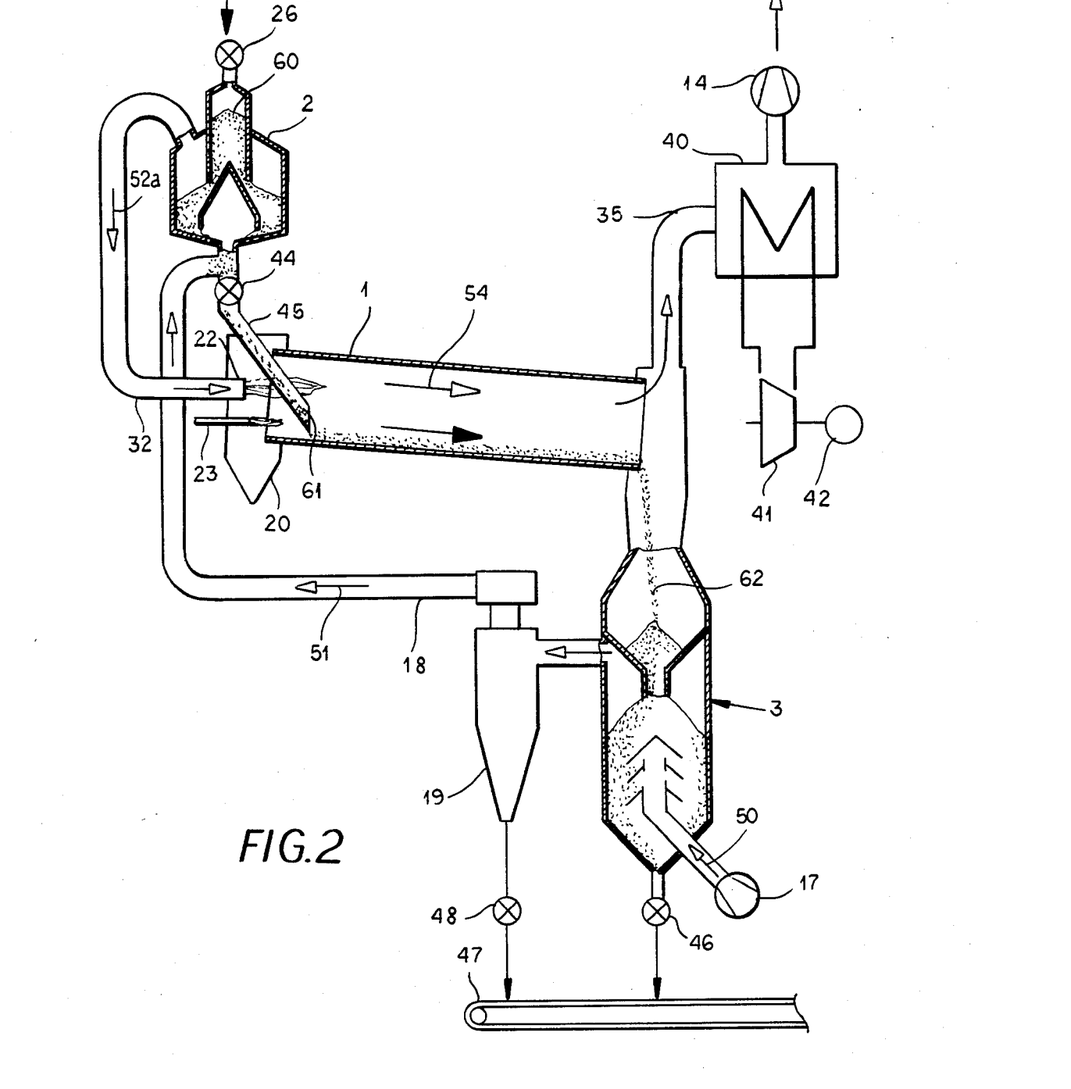
FIG. 2 shows an embodiment of the invention in which the rotary kiln is operated in a concurrent flow or codirectional flow system.

The embodiment of FIG. 2 is also suitable for the burning of relatively coarse feeds, i.e. mineral feeds with a particle size of 20 to 50 mm.

In contrast to the system of FIG. 1, however, the system of FIG. 2, as to the rotary kiln 1, is operated in a codirectional flow, i.e. the hot gases move in the same direction as the solids.

In this embodiment, the hot gas utilized to drive the volatiles from the bituminous limestone is also air supplied at 51 by a duct 18 from a cyclone 19 deriving the heating air from a shaft cooler 3 operating in all respects in the manner previously described.

Here, however, the hot air 51 fed to the organic devolatilizing unit 2 generates a fuel-air mixture 52a which is fed into the rotary kiln 1 at the head 20 to pass in the direction of arrow 54, i.e. the same direction as the solids.

In this case the axial burner 23 also provides its flow at the end of the rotary kiln 1. The hot gases emerge from the lower end of the kiln 1 and are carried away by a product 35 into the waste heat boiler 40 previously described. Otherwise the system of FIG. 2 operates the same as that of FIG. 1. In all of the Figures discussed below similar reference numerals refer to elements functioning similarly to those already described and hence in some cases, such elements need not be additionally described.

Figure 3:
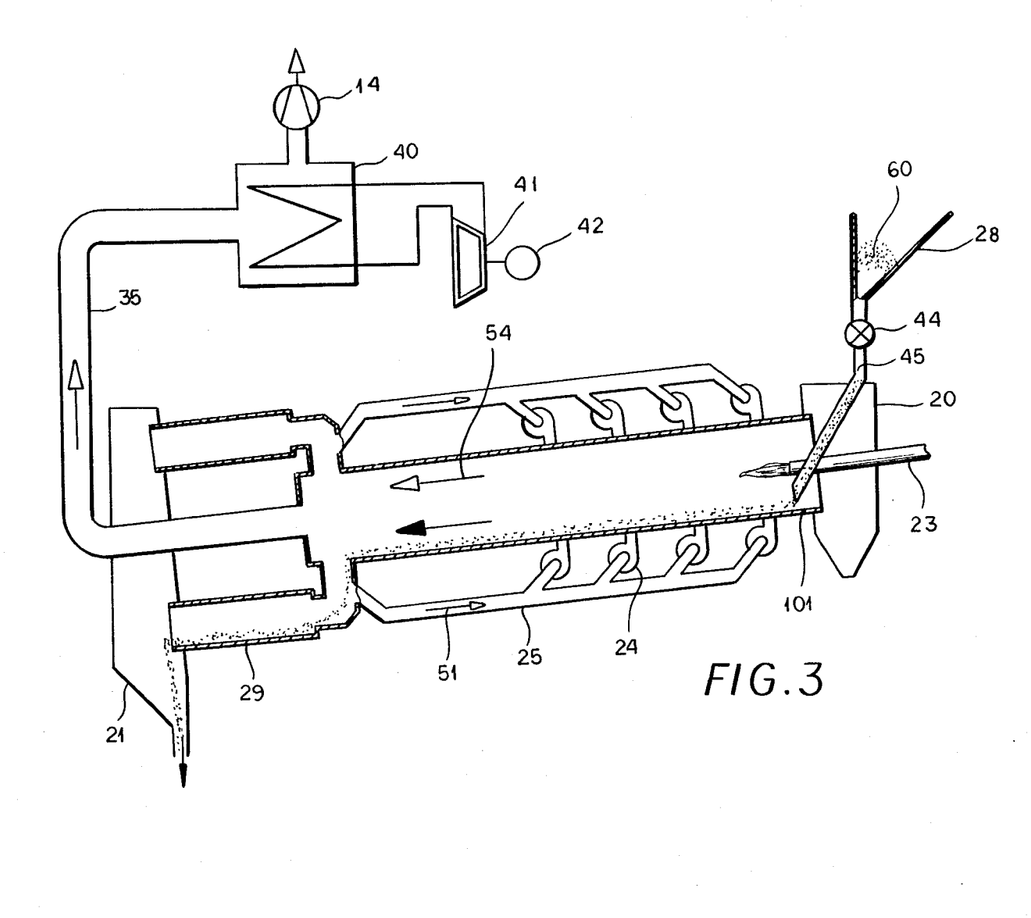
FIG. 3 shows a codirectional system according to the invention.

A more compact codirectional flow system has been shown in FIG. 3, in which the rotary kiln is provided with a satellite cooler and shell blowers. Such shell blowers are well known in the art, rotate with the rotary kiln and serve to blow fluids into the interior of the kiln at axially and angularly spaced locations around the shell as the kiln rotates.

In this embodiment, the bituminous limestone 60 is supplied by a feed-hopper 28 through a cell-type gate 44 and inlet chute 45 directly to the rotary kiln 101. The bituminous limestone, in this case, enters the rotary kiln without having materially been divested of its organic components. It is reheated in the upper portion of the rotary kiln to liberate organic volatiles which then proceed with the hot air downwardly codirectionally with the solids (arrow 54) to burn and produce the calcine. The ignition is maintained by the auxiliary burner 23.

At the downstream end of the rotary kiln 1, a furnace head 21 is provided in which the heated calcine or clinker is recovered through satellite cooling tubes 29, in succession, such tubes being angularly equispaced about the axis of the kiln.

The cooling air is drawn by the shell blowers 24 and ducts 25 through these satellite coolers thereby cooling the clinker and at the same time heating the cooling air so that the latter can serve to drive the bituminous substances from the limestone.

The hot gases are recovered from the rotary kiln via the duct 35 and fed to the waste heat boiler 40.

The axial burner 23 can serve to preheat the bituminous limestone or to effect an initial pyrolytic decomposition of the organic components therein. The mixture of fuel gas (thus created) and hot air is combusted in the lower portion of the clinker to rise the limestone to deacidification and calcination temperature.

In all three of the previously described embodiments, the heat value of the bituminous limestone is driven off in the form of volatiles by means of hot air which has previously been used to cool the clinker and thus, which has previously been utilized, to recover waste heat from the clinker. The fuel thus generated is mixed with air which provides the heat to form a combustible mixture and the combustion of the mixture produces hot gases which effects the deacidification and calcination and thereby heats the solids.

Figure 4:
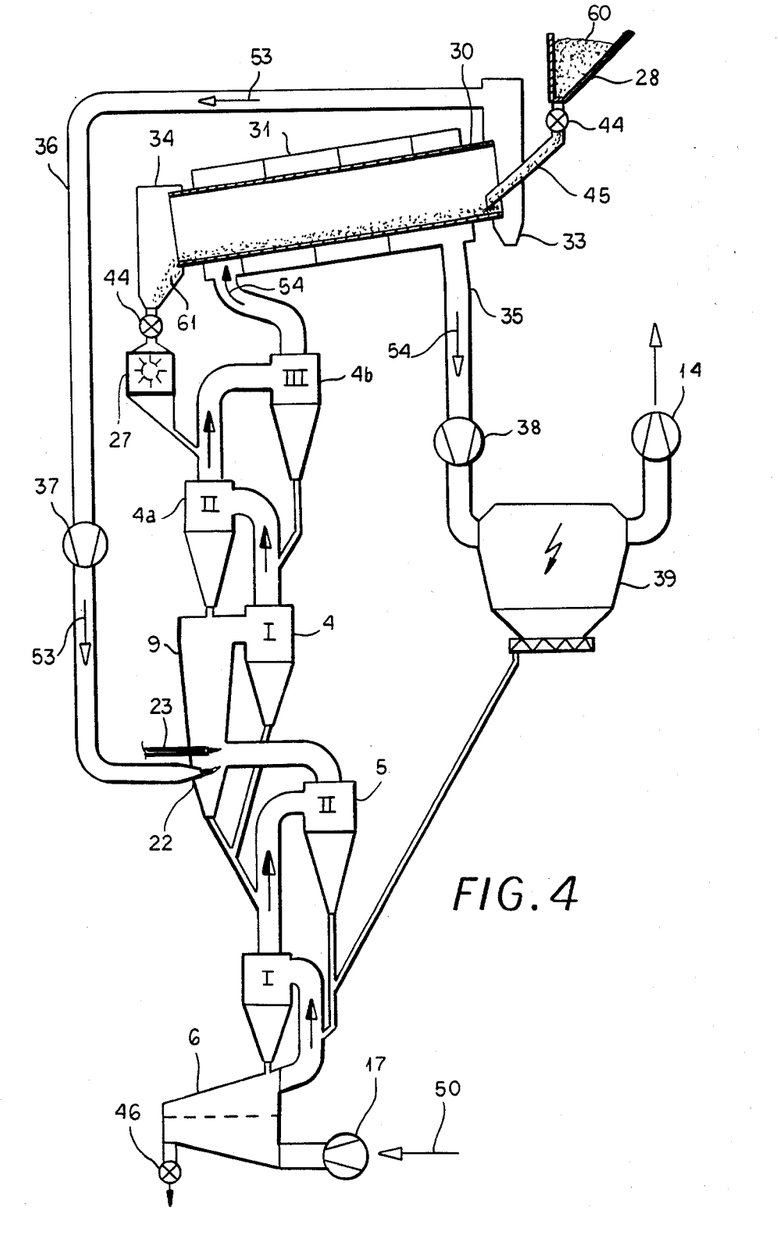
FIG. 4 shows a calcinator utilizing gas suspension of particles and provided with a pyrolysis furnace.
Figure 5:
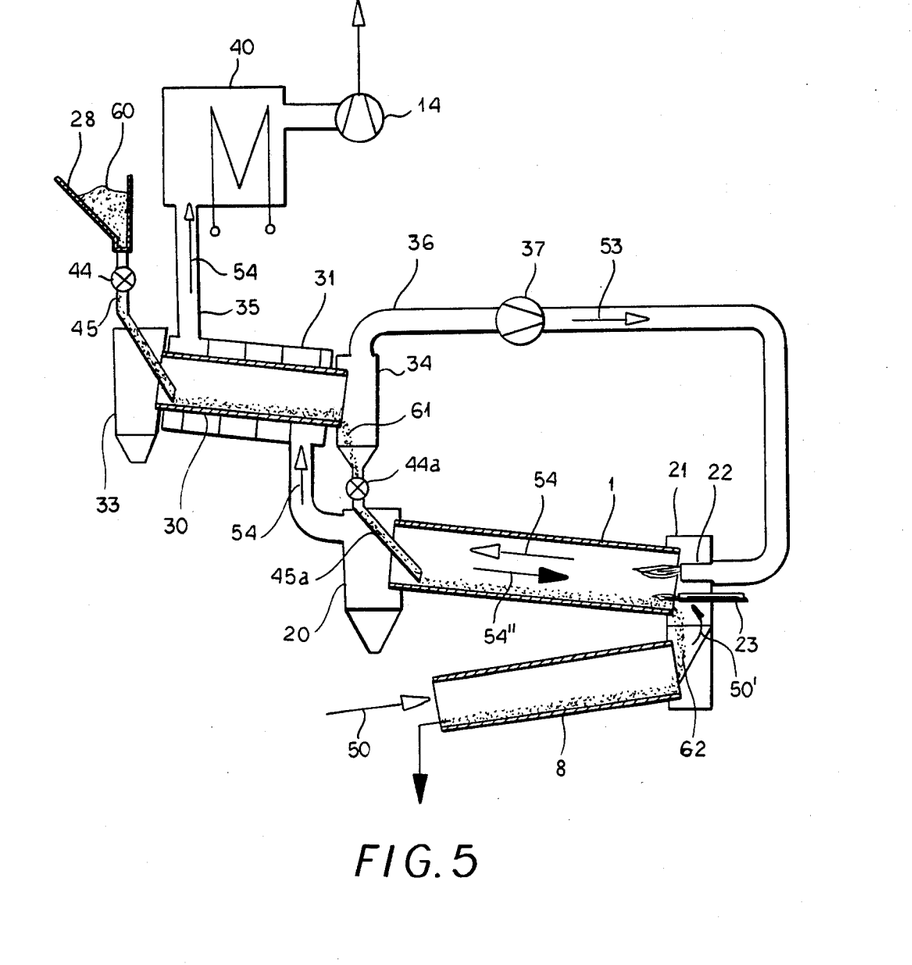
FIG. 5 shows another rotary kiln system of the counterflow type.
Figure 6:
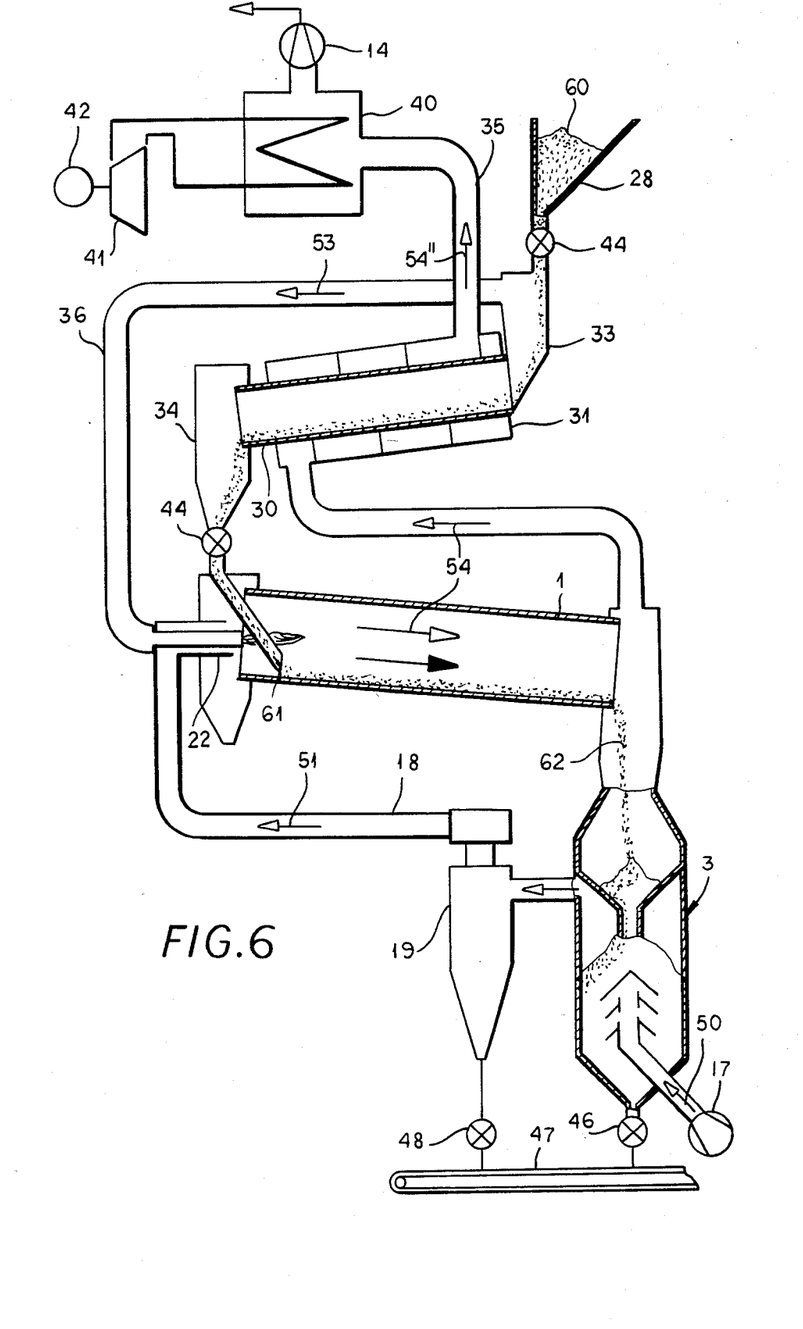
FIG. 6 shows an arrangement utilizing two rotary kiln units and provided with a waste heat burner according to the invention.

In the next three embodiments, the organic volatiles are generated by the direct contact of the bituminous limestone with waste gases from the combustion process.

The embodiment of FIG. 4 has been found to be especially effective for the calcination of particles of an average particle size, i.e. a particle size up to about 20 mm. In this embodiment, the bituminous limestone is fed from a hopper 28 via a cell gate 44 and a chute 45 into an indirectly heated pyrolysis furnace 30/31 in which the organic volatiles are driven off and pyrolyzed to produce the organic fuel components.

This unit can comprise a rotary kiln 30 whose shell is provided with a helical chamber 31 into which furnace exhaust gases are directed as shown at 54 at a temperature sufficient to cause volatilization of the organic components and pyrolysis.

The limestone from which most of the volatiles have been removed is represented at 61 and is fed by a head 34 at the lower end of the kiln 30 and a cell gate 44 to a hammermill 27 in which the clinker is comminuted further, e.g. to a particle size below 2 mm. The pyrolysis in the oven 30/31 takes place at a temperature of 500° to 600° C. so that a fuel gas is generated which ignites at the upper end of the furnace and is collected in a head 33 and conducted by duct 36 and a blower 37 to a combustion chamber of a solids-suspension system in the form of a calcination shaft 9.

The calcination shaft 9 is operated as an expanded fluidized bed, i.e. the fuel introduced at the bottom of the bed, air introduced at the bottom to gases which result from the combustion of the fuel and gases which are generated by an auxiliary burner 23, all serve to keep the particles within the calcinator 9 in an estimated state during the deacidification, and calcination, the calcined particles being entrained from the tube of the calcinator 9 into the first cyclone 4 of a three-cyclone gas cleaning stage made up of cyclones 4, 4a and 4b.

The cyclones 4, 4a and 4b form a three-stage preheater for the solids which raise the temperature thereof to 850° C. before they enter the calcinator 9. More specifically, the solids passed by the hammermill 27, flow downwardly through the cyclone 2 into the calcinator 9 while particles separated from the gas in cyclone 4 are also precipitated out in cyclone 4a and collect therein together with particles which are recovered from cyclone 4b.

The solid product can in part be fed by the cyclone 4 to a two-stage cyclone-type cooler 5 with the particles being then fed to a fluidized bed cooler 6 and being used to preheat fresh air supplied by a blower 17. This fresh air after being preheated, is fed to the calcinator 9 where it burns with the fuel delivered by burner 22.

The hot gas emerging from the pyrolysis unit 30/31 is at a substantially lower temperature than that (about 600° C.) at which it was admitted and can be cleaned in an electrostatic filter through which it is displaced by a blower 38 and from which the gas can be driven by a blower 14. The lime dust particles can be fed to the cooling system 5, 6 for combination with the product.

In the embodiment of FIG. 5, three rotary kilns, operating in counterflow, are provided and the system can be utilized effectively for fine to average particle sizes, e.g. particle sizes up to 25 mm. In this embodiment, the bituminous lime is fed by a hopper 28 via a cell gate 44 and a chute 45 into an indirectly heated rotary kiln 30 forming part of a pyrolysis furnace 30, 31.

In this pyrolysis furnace 30, 31 the bituminous limestone is heated to vaporize the organic components contained therein and to pyrolyze these components and thereby produce a combustible or fuel gas. The fuel gas is collected as represented at 53 by the head 34 and is drawn off via line 36 and blower 37.

The fuel gas is introduced into a burner 22 opening via a furnace head 21 into the bottom of a further rotary kiln 1 to which combustion air is also fed, the combustion air burning with the fuel so that hot combustion gases run upwardly through the rotary to kiln 1 to calcine the lime which passes downwardly therethrough as represented by arrow 54''.

The bituminous limestone which is subjected to pyrolysis temperature in oven 30 by the passage of hot gases 54 through the mantle 31 around the rotary kiln 30, is transformed into limestone substantially free from the organic component at 61 and this limestone is fed via the cell gate 44a and the shoot 45a through the furnace head 20 into the calcining kiln 1.

The fresh air is introduced at 50 into the lower end of the rotary kiln cooler 8 where the air passes in counterflow to the calcined solids 62 which are transferred via the head 21 to the cooler tube 8. The heated air thus is delivered by the head 21 as represented by the arrow 50' into the lower end of the kiln 1.

A further embodiment has been illustrated in FIG. 6 and utilizes codirectional flow in the kiln, a shaft cooler and a rotary kiln for the pyrolysis and generation of the fuel gas.

This embodiment has been found to be effective for bituminous limestones having a particle size of 5 to 30 mm.

When, instead of a cooling shaft, a cooling drum is used, the system can be effective over a broader particle size range running to about 50 mm.

In this embodiment bituminous limestone 60 is fed by a hopper 28 and a cell gate 44 into an independently heated pyrolysis furnace 30, with a furnace head 33.

Via a furnace head 34 and a cell gate 44, the limestone, freed from the gasifiable components, is fed into the rotary kiln 1 for calcination and a line 62 then passes into a shaft cooler 3, the latter is supplied with air 50 via a blower 17.

The cooled product is discharged via cell gate 46 onto a conveyor 47 and the heated air from the shaft cooler 3 traverses the cyclone 19 and is fed by duct 18 coaxially into the calcinator 1 with the fuel from the main burner 22. The solids from the cyclone 19 also are transferred via the cell gate 28 to the belt 47.

The fuel gas delivered via line 36 and represented by arrow 53 is recovered from the bituminous limestone in the pyrolysis unit 30 and burns together with the preheated air to produce calcining gases at a temperature in excess of 850° C. and such that the limestone is calcined at a temperature up to 1000° C., the hot gas at this latter temperature being recovered at 54'' and being fed to the waste heat boiler 40.

It should be understood that, while the invention is most advantageously used for the calcination of bituminous limestone, it can also be utilized for the calcination of other mineral materials containing volatile components having a heat value or for the calcination or sintering of other materials such as concrete clinker components, clay and the like with or without oil shale or bituminous shale clay or carbon-containing clays, hydraulic lime or natural cement from bituminous marl, dolomitic lime from bituminous dolomite, for the calcination of quartz from oil sands, for the calcination of Fuller's clay from oil refinery clay wastes and the like. Efficiency is improved when the calcination temperature lies significantly above the gasification temperature of the heat carrier; this applies not only to natural mineral substances but also the synthetic mixtures and wastes.

We claim:

1. A method of calcining mineral matter containing heat value in the form of volatilizable combustible organic substances, comprising the steps of:
   (a) burning a gas mixture of air and said volatilizable substances from the volatilization thereof and calcining the mineral matter following removal of at least a substantial portion of said volatilizable substances therefrom to form a hot calcined product at a location different from that at which the removal was effected;
   (b) recovering heat from said hot calcined product; and
   (c) subjecting the mineral matter containing the volatilizable substances to the recovered heat at a location different from that at which calcination occurs to drive said volatilizable substances from said mineral matter containing same to thereby form a combustible gas mixture from said substances for use in step (a) and a mineral matter from which said substances have been removed for calcination in a repetition of step (a) for the latter mineral matter, said hot product being subjected to cooling with air, said gas mixture in step (a) including cooling air heated by said hot product, the volatilizable substances being driven out of said mineral matter by passing same and a hot gas in codirectional flow in a rotary furnace and thereafter passing the burning gas mixture and said mineral matter for calcination in a codirectional flow through a rotary furnace.

2. The method defined in claim 1 wherein a hot gas is said air and is introduced by shell blowers into the rotary furnace for the driving out of the volatilizable substances from said mineral matter, the calcination being effected after an ignition of said mixture by dosed air supply in a temperature range slightly above the dissociation temperature of the mineral matter.

* * * * *